US012482959B2

(12) United States Patent
Neumann et al.

(10) Patent No.: US 12,482,959 B2
(45) Date of Patent: Nov. 25, 2025

(54) ELECTRICAL CONTACT ELEMENT HAVING A FRAME CLAMP FOR CONNECTING AT LEAST TWO ELECTRICAL CONDUCTORS

(71) Applicant: BRUSS SEALING SYSTEMS GMBH, Hoisdorf (DE)

(72) Inventors: Samuel Neumann, Ahrensburg (DE); Thomas Schrader, Hamburg (DE); Patrick Danberg, Hohenhameln (DE); Manfred Brand, Tremsbüttel (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 385 days.

(21) Appl. No.: 18/110,698

(22) Filed: Feb. 16, 2023

(65) Prior Publication Data

US 2023/0275366 A1 Aug. 31, 2023

(30) Foreign Application Priority Data

Feb. 28, 2022 (DE) ..................... 10 2022 104 701.6

(51) Int. Cl.
*H01R 4/30* (2006.01)
*H01R 13/516* (2006.01)
*H01R 13/627* (2006.01)

(52) U.S. Cl.
CPC ........... *H01R 4/305* (2013.01); *H01R 13/516* (2013.01); *H01R 13/6271* (2013.01)

(58) Field of Classification Search
CPC .. H01R 4/305; H01R 13/516; H01R 13/6271; H01R 9/24; H01R 2105/00; H01R 4/38;
(Continued)

(56) References Cited

U.S. PATENT DOCUMENTS 1,266,441 A 5/1918 Finkelstein
4,070,086 A * 1/1978 Trafford ............... H01R 12/515 439/717
(Continued)

FOREIGN PATENT DOCUMENTS

AT 315275 B 5/1974
CH 514240 A 10/1971
DE 195 13 645 A1 10/1996

OTHER PUBLICATIONS

Search Report issued by the German Patent and Trademark Office dated Oct. 5, 2022 with respect to the German priority application No. 10 2022 104 701.6.

*Primary Examiner* — Truc T Nguyen
(74) *Attorney, Agent, or Firm* — SALIWANCHIK, LLOYD & EISENSCHENK

(57) ABSTRACT

An electrical contact element having a frame clamp comprises a frame with a stationary thread, a clamping shoe and a clamping screw engaging in the stationary thread and being supported on the clamping shoe. A plastic holder with a cavity having two insertion openings arranged on opposite walls of the cavity is provided for inserting two electrical conductors to be contacted with one another, in which the frame clamp is arranged. The frame clamp is captively fixed in the cavity of the plastic holder by means of a latching. The frame clamp is mounted in a floating manner in the cavity of the plastic holder in the direction of at least one axis, which is oriented orthogonally to an insertion direction of the electrical contacts into the insertion openings.

10 Claims, 3 Drawing Sheets

(58) Field of Classification Search
CPC ........ H01R 4/363; H01R 13/40; H01R 13/02; H01R 13/502
See application file for complete search history.

(56) References Cited

U.S. PATENT DOCUMENTS

| | | | | |
|---|---|---|---|---|
| 4,669,806 | A * | 6/1987 | Fuchs | H01R 4/363 439/813 |
| 4,758,186 | A * | 7/1988 | Barriuso | H01R 4/363 439/723 |
| 7,798,869 | B1 * | 9/2010 | Konopacki | H01R 4/363 439/812 |
| 9,299,523 | B1 * | 3/2016 | Whipple | H01R 9/2408 |
| 9,812,829 | B1 * | 11/2017 | Weiden | H01R 4/363 |
| 2007/0004260 | A1 * | 1/2007 | Drexler | H01H 1/5855 439/188 |
| 2009/0081897 | A1 * | 3/2009 | Waltz | H01R 13/533 29/428 |
| 2010/0107831 | A1 * | 5/2010 | Carson | B23B 29/046 82/160 |
| 2013/0279995 | A1 * | 10/2013 | Hecht | B23B 29/043 407/101 |
| 2023/0170161 | A1 * | 6/2023 | Rosas Salazar | H01H 71/08 |
| 2023/0275366 | A1 * | 8/2023 | Neumann | H01R 4/363 439/801 |

* cited by examiner

ELECTRICAL CONTACT ELEMENT HAVING A FRAME CLAMP FOR CONNECTING AT LEAST TWO ELECTRICAL CONDUCTORS

CROSS-REFERENCE TO RELATED APPLICATION

This application claims priority to German Patent Application No. 10 2022 104 701.6, filed on Feb. 28, 2022; which is incorporated in its entirety herein.

FIELD OF THE INVENTION

The present invention relates to an electrical contact element having a frame clamp for connecting at least two electrical conductors with the features of the preamble of claim 1.

BACKGROUND OF THE INVENTION

Electrical contact elements are used, for example, in vehicle technology for contacting at least two electrical conductors of an electric drive or a battery cell or energy cell. In this case, the electrical contact elements themselves serve to produce the electrical contacts between the electrical conductors by fixing the electrical conductors in the contact position and applying the clamping forces required for the connection. For this purpose, the electrical contact elements of the generic type have a frame clamp, which itself has a frame with a stationary thread, a clamping shoe and a clamping screw engaging in the stationary thread and supported on the clamping shoe for clamping the electrical contacts. The clamping screw serves to apply the required clamping forces via the clamping shoe, while the frame of the frame clamp serves as an abutment and receptacle for the electrical conductors. The frame itself is formed by a metal strip bent repeatedly, which, in addition to its function of forming the abutment, additionally serves to hold the thread in a stationary manner, into which the clamping screw engages and is supported during the screwing movement. The frame thus also forms the abutment necessary for applying the required clamping forces for the clamping screw.

The invention is based on the object of providing an electrical contact element having a frame clamp, which is to be handled as easily as possible for implementing the electrical contact.

BRIEF SUMMARY

In order to achieve the object, it is proposed according to the basic idea of the invention that a plastic holder having a cavity having two insertion openings arranged on opposite walls of the cavity is provided for inserting two electrical conductors to be contacted with one another, in which cavity the frame clamp is arranged, and the frame clamp is captively fixed in the cavity of the plastic holder by means of a latching, and the frame clamp is mounted in the cavity of the plastic holder in a floating manner in the direction of at least one axis, which is oriented orthogonally to an insertion direction of the electrical conductors into the insertion openings.

According to the solution according to the invention, it is thus proposed to provide a plastic holder with a cavity in which the frame clamp is arranged. The plastic holder serves to insulate the frame clamp from the outside and in particular to the vehicle structure and, if present, in addition to adjacent frame clamps. In addition, the plastic holder serves to protect the frame clamp and the electrical contact point from the outside. Furthermore, the electrical contact element can be handled in a simplified manner by the plastic holder during the assembly process by the plastic holder comprising a specific shape for handling in an automated assembly process, for example. Furthermore, a direct contact of the frame clamp during the handling of the electrical contact element can be avoided by the handling of the electrical contact element via the plastic holder. So that the electrical conductors can be contacted as intended by means of the frame clamp arranged in the plastic holder, the cavity of the plastic holder has an insertion opening on two opposite walls, through which the electrical conductors can be inserted. So that the electrical contact element can be handled in a simplified manner during transport and during assembly, the frame clamp is also held captively in the plastic holder by a latching that is easy to realize. It is further proposed that the frame clamp is mounted in a floating manner in the cavity of the plastic holder in the direction of at least one axis, which is oriented orthogonally to an insertion direction of the electrical conductors into the insertion openings. The floating mounting enables the electrical conductors to be contacted with a certain height tolerance of the conductors. The frame clamp can, practically within the play created by the floating mounting, automatically align itself with the electrical conductors in the case of a stationary plastic holder. In this case, the floating mounting can be realized very easily in conjunction with the latching, in that the latching and the latching position of the frame clamp defined thereby is designed such that the frame clamp is arranged in the latching position with a corresponding play to form an abutment of the plastic holder and can thereby carry out slight movements in relation to the latter.

It is further proposed that the frame has at least one recess, and the plastic holder has at least one first latching lug arranged on an inner side of a wall of the cavity, and the latching is formed by an engagement of the first latching lug in the recess. As a result of the recess on the frame and the first latching lug protruding into the cavity, the frame clamp automatically latches with its frame into the cavity relative to the plastic holder during the insertion movement.

It is further proposed that the engagement of the first latching lug in the recess in this case limits the floating mounting in one direction of the axis. In addition to its latching function, the first latching lug thus forms one of the stops of the floating mounting of the frame clamp in a direction of the axis relative to the plastic holder.

It is further proposed that the plastic holder comprises an insertion opening for the frame clamp, and the first latching lug has a shape which tapers in the direction of the insertion movement of the frame clamp conically towards the center of the plastic holder on its side facing the insertion opening. As a result of the proposed embodiment of the latching lug, the latter is displaced continuously toward the outer side during the insertion movement with an increasing deflection, such that the latching process can be realized as gently as possible with as little load as possible on the latching lug, the plastic holder and finally the frame clamp.

It is further proposed that the plastic holder has at least one second latching lug, which is positioned such that it blocks a movement of the clamping shoe in the direction of an abutment arranged on the frame up to a predetermined pressure force of the clamping shoe. The two electrical contacts are inserted into the frame clamp into a free space between the clamping shoe and a base surface of the frame for the production of the electrical contact and then clamped by screwing the clamping screw between the clamping surface of the clamping shoe and the base surface of the frame. So that the electrical contacts can be reliably inserted into the free space, the clamping shoe is held by the second latching lug at a defined minimum distance from the base surface of the frame, such that the free space between the base surface of the frame and the clamping surface of the clamping shoe has a sufficient opening width for inserting the electrical conductors. In this case, the second latching lug is dimensioned such that, when the clamping screw is screwed and a feeding movement of the clamping shoe which is thereby forced after a predetermined compressive force is exceeded, the second latching lug automatically deforms towards the side and subsequently no longer prevents the further clamping movement of the clamping shoe. Furthermore, prior to screwing, the second latching lug prevents an uncontrolled movement in the direction of the clamping surface of the frame and thereby forms an additional securing of the clamping shoe against unintentional slipping out of the plastic holder.

In this case, the second latching lug can preferably have a shape which tapers in the direction of the clamping movement of the clamping shoe conically towards the center of the plastic holder on its side facing the clamping shoe. As a result, the rise in the compressive force required to overcome the second latching lug can be formed to be continuously increasing.

In this case, the second latching lug is designed such that the predetermined pressure force, up to which the movement of the clamping shoe is blocked, is smaller than the counterforce exerted by the first latching lug on the frame. The first and second latching lugs are identical in their latching direction, wherein the first latching lug is already latched after the assembly, i.e. the return movement of the frame from the cavity of the plastic holder is blocked in a latching position, while the second latching lug is not yet latched.

The compressive force exerted on the clamping shoe is brought about by a screw connection of the clamping screw in the thread of the frame, such that the feeding movement of the clamping shoe results in an oppositely directed tensile force exerted on the frame via the thread. This tensile force is supported on the plastic holder via the first latching lug. So that the frame clamp executes the feeding movement into the frame during the screwing together with the clamping shoe and is not instead pulled out of the plastic holder with the frame, overcoming the first latching lug, the reaction force exerted by the first latching lug can be greater than the compressive force of the clamping shoe that is to be overcome during the feeding movement of the clamping shoe and defined by the second latching lug. These force conditions can be realized very easily by the shape of the two latching lugs and the corresponding counter surfaces on the clamping shoe and the frame.

It is further proposed that the first latching lug and the second latching lug are arranged on inner side faces of the walls of the cavity of the plastic holder, which side faces are arranged at right angles to one another. Due to the proposed arrangement of the two latching lugs, the plastic holder can be produced particularly easily in an injection-molding process. Furthermore, the plastic holder is thus loaded more uniformly, and the latching processes can be carried out more easily without a mutual interference. A further advantage of this solution is that, in the event of a deformation of the walls with the second latching lugs towards the outside during the overcoming of the second latching lugs, this deformation does not have a disadvantageous influence on the latching of the first latching lugs, since the first and the second latching lugs are arranged on different walls.

It is further proposed that in each case two pairs of first and/or second latching lugs are provided, which are each arranged in pairs on opposite walls of the cavity of the plastic holder. The latching function realized by the first and the second latching lugs can thus be improved by the opposite arrangement of two latching lugs in each case by means of the opposite arrangement of two first latching lugs or two second latching lugs, since this enables latching of the frame clamp or a play-free mounting of the clamping shoe to two opposite walls, thus a latching with increased stability with respect to the plastic holder.

It is further proposed that the plastic holder comprises guide ribs on the inner side surfaces of the walls, which run parallel to the direction of the insertion movement of the frame clamp. As a result of the guide ribs, the movement of the frame clamp overall can be improved by a guide as such and in particular in a direction predetermined by the guide ribs.

It is further proposed that at least one further frame clamp is provided in the plastic holder, which frame clamp is mounted insulated by the plastic holder. The proposed development makes it possible to use the electrical contact element for contacting further electrical lines, which are thus insulated from one another independently of one another.

BRIEF DESCRIPTION OF THE FIGURES

The invention is explained below using preferred embodiments with reference to accompanying figures. In the drawings.

DETAILED DESCRIPTION

Figure 1:
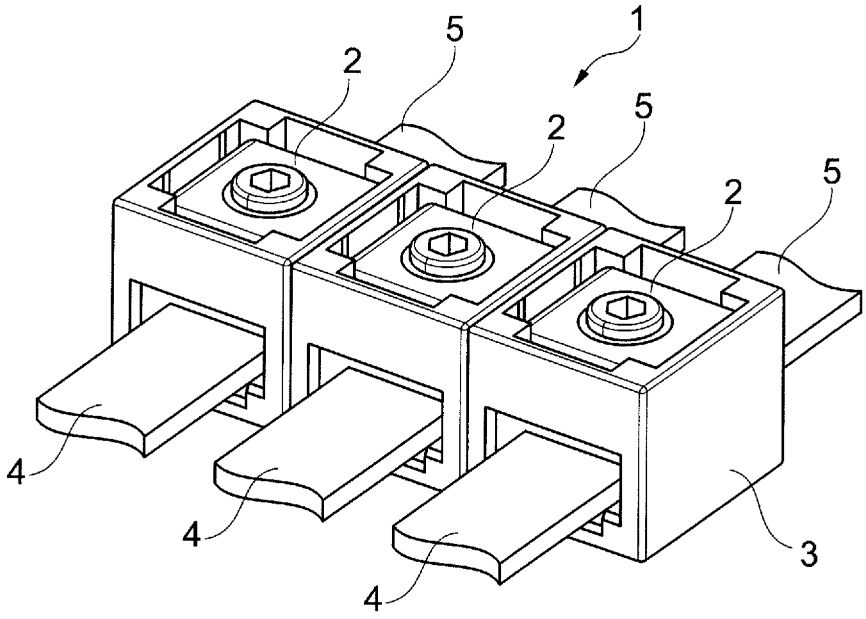
FIG. 1 shows an electrical contact element according to the invention having three frame clamps.

FIG. 1 shows an electrical contact element 1 according to the invention having a plastic holder 3 and three frame clamps 2 held insulated in the latter. Each of the frame clamps 2 serves for electrical contacting of two electrical conductors 4 and 5 in each case. The electrical conductors 4 and 5 are formed in strip form with correspondingly large planar contact surfaces and in each case a large line cross-section. Such electrical conductors are preferably used for transmitting high electrical powers such as, for example, in electric drives of motor vehicles, other types of land vehicles, ships, airplanes or even in stationary systems such as, for example, photovoltaic systems, wind power plants, etc. The plastic holder 3 comprises three cavities 8 in which the frame clamps 2 are arranged. The cavities 8 are each separated from one another by the walls 17, such that the frame clamps 2 held therein are additionally electrically insulated from one another.

Figure 2:
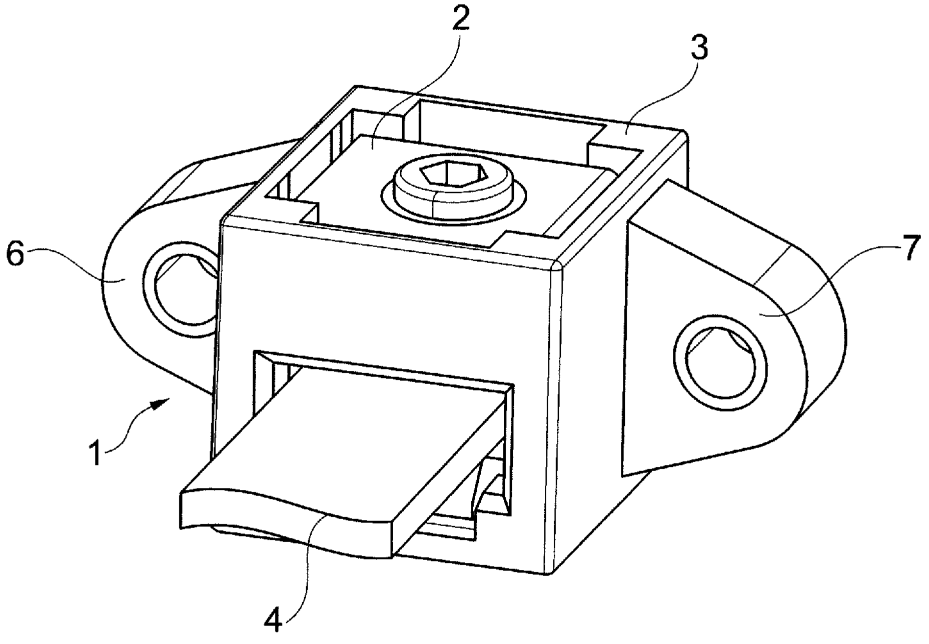
FIG. 2 shows an electrical contact element according to the invention having a plastic holder having two fastening eyes.

FIG. 2 shows a further embodiment of the electrical contact element 1, in which two fastening eyes 6 and 7 are additionally provided on the outer side of the plastic holder 3, which fastening eyes 6 and 7 enable fastening of the electrical contact element 1 to an external component, for example on a vehicle structure or also a fastening of a further add-on part to the electrical contact element 1. Furthermore, the fastening of the electrical contact element 1 via the fastening eyes 6 and 7 additionally creates a possibility to align the electrical contact element 1, with respect to the electrical conductors 4 and 5, before or after the contact or the clamping of the electrical conductors 4 and 5. Assembly can thereby be facilitated. In addition, the forces acting on the electrical contact connection of the two electrical conductors 4 and 5 can thereby be reduced.

Figure 6:
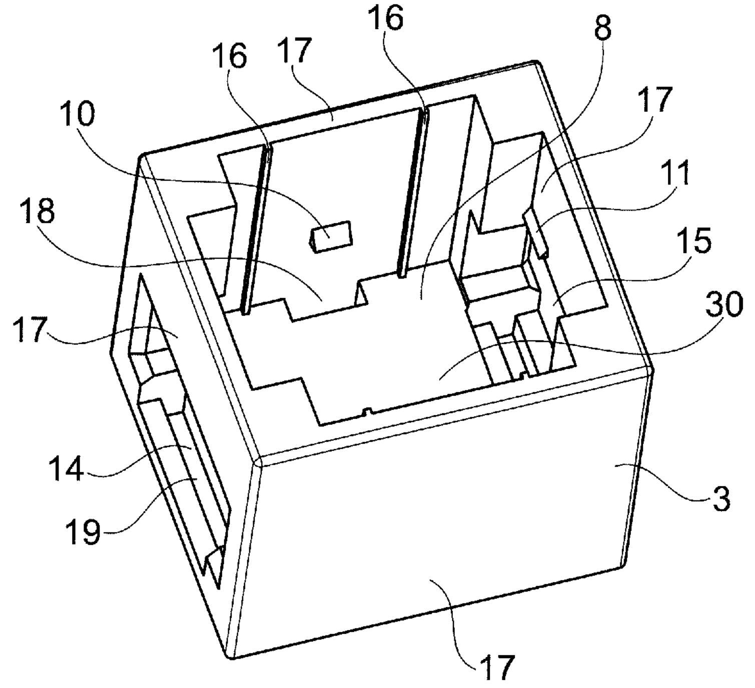
FIG. 6 shows a plastic holder in an isometric view.
Figure 7:
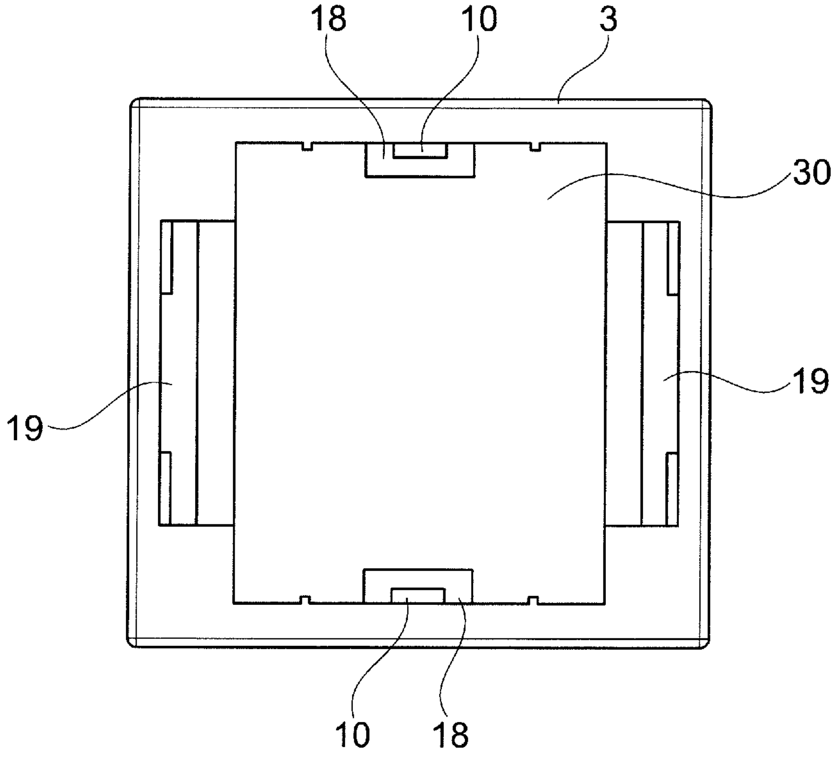
FIG. 7 shows the plastic holder in a view from below of the base plate.

The plastic holder 3 of the electrical contact element 1 can be seen as an individual part in FIGS. 6 and 7 and has a cube shape having a base plate 30 and four walls 17 standing upright perpendicularly. The walls 17 adjoining one another are each arranged perpendicular to one another and thus enclose a cuboidal cavity 8. The cavity 8 is provided with an insertion opening to one side, in this case the upper side, through which the frame clamp 2 is inserted. Furthermore, the plastic holder 3 has two opposite insertion openings 14 and 15 arranged in alignment with one another. Two guide ribs 16 arranged in the insertion direction of the frame clamps 2 are provided on the inner side surfaces of the walls 17 and come into contact with the outer side of the frame clamp 2 when the frame clamp 2 is inserted and thus guide the frame clamp 2 into the predetermined position.

Figure 3:
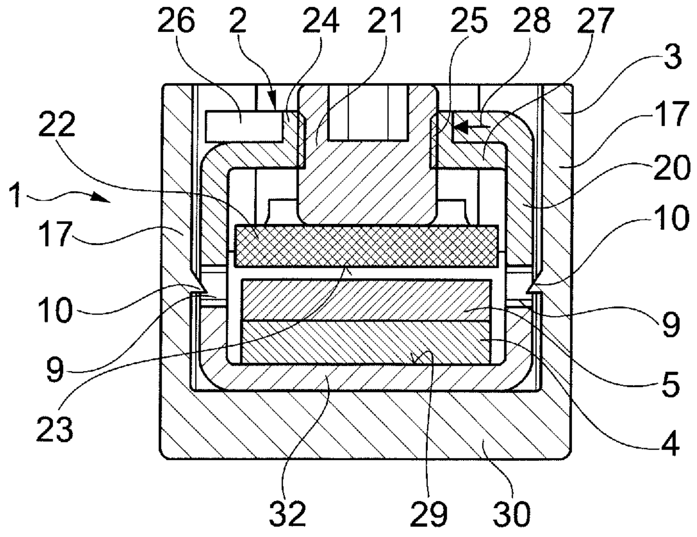
FIG. 3 shows an electrical contact element according to the invention in a first sectional view.

FIG. 3 shows the electrical contact element 1 having a single frame clamp 2 in the cutting direction by first latching lugs 10 in a plane perpendicular to the insertion direction of the electrical conductors 4 and 5. The frame clamp 2 is designed as a pre-assembled assembly and comprises a frame 20, a clamping screw 21 and a clamping shoe 22. The frame 20 is formed by a metal strip bent repeatedly, which is placed on top of one another with its ends 26 and 27 to form a rectangular frame 20 closed in the circumferential direction. In the lower end 27 of the strip, an opening having an annular extension 24 projecting toward the upper side is provided, on the inside of which a thread 25 is provided. An opening 28 is also provided in the other upper end 26, the inner diameter of which corresponds to the outer diameter of the annular extension 24, such that the upper end 26 is folded back onto the lower end 27, such that it comprises the projecting annular extension 24 of the lower end 26 with its opening 28.

The clamping screw 21 is designed as a hexagonal socket screw and engages with its thread into the thread 25 of the frame 20. The thread 25 is formed by the shaping with the annular extension 24 in the one end 27 of the strip in an integral component of the frame 20 and thus in a stationary manner. However, it would also be conceivable to use a threaded insert, which is produced as a separate part and is held stationary relative to the frame 20. In this case, stationary is to be understood in the sense of the invention in that the clamping screw 21 can be supported on the thread 25 during the screwing movement and is forced to the feeding movement explained in more detail below.

The clamping screw 21 projects with its free end into the frame 20 and is provided at its free end with a clamping shoe 22. Furthermore, the frame 20 comprises in each case a recess 9 on its upright side walls, which side walls are positioned in such a way that the frame clamp 2 automatically latches into the recesses 9 by engagement of two oppositely arranged first latching lugs 10 of the plastic holder 3 when inserted into the insertion opening of the cavity 8 and is thereby held captively in the plastic holder 3. The first latching lugs 10 are arranged on the inner side surfaces of two opposite walls 17 of the plastic holder 3 and project into the cavity 8. Furthermore, the first latching lugs 10 are conically shaped in that the surfaces 7 of the first latching lugs 10 facing the insertion opening of the cavity 8 run obliquely to the center of the cavity 8 in the insertion direction of the frame clamp 2 and starting from the walls 17. The surfaces of the first latching lugs 10 facing away from the insertion opening are oriented perpendicular to the inner side surfaces of the walls 17 and thus perpendicular to the insertion direction of the frame clamp 2, such that the first latching lugs 10 come to rest in the latched position with their vertical surfaces on the edges of the recesses 9 and block a retraction movement of the frame clamp 2. In the latched position, the frame clamp 2 is then captively held in the cavity 8 of the plastic holder 3. Alternatively, the first latching lugs 10 can also be formed by an upper, inwardly projecting edge portion which, after being inserted, comprises the upper side of the frame clamp 2 and thereby blocks the retraction movement of the frame clamp 2, as a result of which the recesses 9 for latching the frame clamp 2 can again be omitted.

The position of the first latching lugs 10 is selected in conjunction with the arrangement of the recesses 9, such that the frame clamp 2 is mounted in a floating manner in the plastic holder 3 via the first latching lugs 10 between the base plate 30 of the plastic holder 3 and the first latching lugs 10 in the direction of the insertion movement of the frame clamp 2 into the plastic holder 3.

The clamping shoe 22 comprises a clamping surface 23 on its side facing the base plate 32 of the frame 20. The base plate 32 of the frame 2 also comprises a clamping surface 29 on the surface facing the clamping shoe 22. The free space between the clamping surfaces 23 and 29 serves to introduce and clamp the electrical conductors 4 and 5, as will be described in more detail below.

Figure 4:
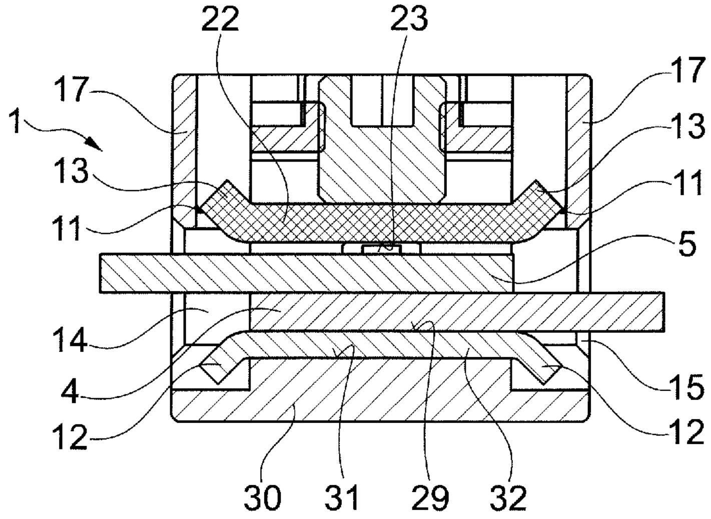
FIG. 4 shows an electrical contact element according to the invention in a second sectional view.

FIG. 4 shows the electrical contact element 1 in the cutting direction of a plane running parallel to the insertion direction of the electrical conductors 4 and 5 and by the second latching lugs 11. The clamping shoe 22 and the base plate 32 of the frame 20 each comprise insertion bevels 12 and 13 extending at an angle to the outer sides at their edge sides facing the insertion openings 14 and 15 of the plastic holder 3, which facilitate the insertion of the electrical conductors 4 and 5 during assembly. The insertion bevels 12 and 13 extend the free space between the clamping surfaces 23 and 29 in the direction of the insertion openings 14 and 15 towards the outer sides, such that the electrical conductors 4 and 5 are deflected into the free space between the clamping surfaces 23 and 29 in the event of an eccentric insertion into the insertion openings 14 and 15 on the insertion bevels 12 and 13. The insertion bevels 12 and 13 thus enable guidance of the electrical conductors 4 and 5 during the insertion movement and thus a simplified mounting and contacting of the electrical conductors 4 and 5. Since the frame clamp 2 is further mounted in a floating manner in the direction of the vertical axis, i.e. the Z-axis of the plastic holder 2 perpendicular to the insertion directions of the electrical conductors 4 and 5 into the insertion openings 14 and 15, the frame clamp 2 can adapt certain height tolerances of the supplied electrical conductors 4 and 5 by utilizing the play of the mounting. In this way, tensions in the feeding and the contacting of the electrical conductors 4 and 5 can be reduced or avoided. Furthermore, the mounting or contacting of the conductors 4 and 5 as such can be simplified.

Figure 5:
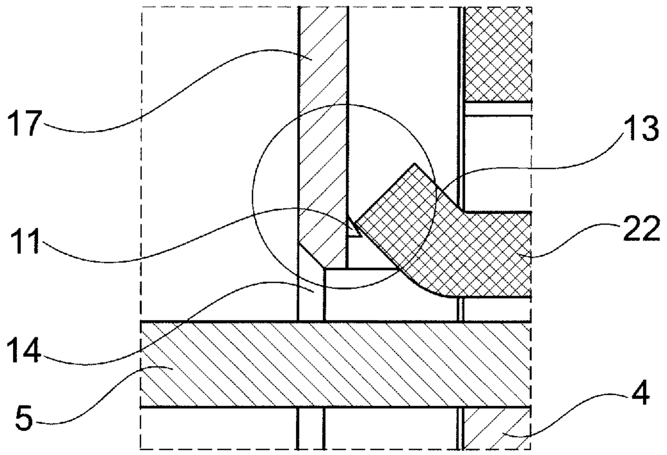
FIG. 5 shows an enlarged detail of the contact element.

Two second latching lugs 11 are arranged on the upper edge sides of the insertion openings 14 and 15, said second latching lugs 11 having a conical shape, similar to the first latching lugs 10, on the upper sides thereof facing the insertion opening of the plastic holder 3, having a shape extending from the walls 17 in the insertion direction of the frame clamp 2 into the cavity 8, extending towards the center of the cavity 8. The second latching lugs 11 are positioned in such a way that the clamping screw 21, with its clamping shoe 22 and the insertion bevels 13 formed thereon, rests against it before the electrical conductors 4 and 5 are installed and is held at a distance from the base plate 32. As a result, the free space between the clamping surfaces 23 of the clamping shoe 22 and the clamping surface 29 of the base plate 32 is kept open for a reliable insertion of the electrical conductors 4 and 5. Due to the contact of the clamping shoe 22 with its insertion bevels 13 on the conical surfaces of the second latching lugs 11, the clamping shoe rests as flat as possible against the second latching lugs 11, as can also be seen in the enlarged view of FIG. 5. For this purpose, the conical surfaces of the second latching lugs 11 and the surfaces of the insertion bevels 13 that abut against them can have an identical angle.

For mounting or electrical contacting of the electrical conductors 4 and 5, these are first inserted into the free space between the clamping surfaces 23 and 29 through the insertion openings 14 and 15 of the plastic holder 3. In this case, certain height deviations of the electrical conductors 4 and 5 can be compensated by the floating mounting of the frame clamp 2. Furthermore, the insertion movement of the electrical conductors 4 and 5 is simplified and guided by the insertion bevels 12 and 13. After the insertion of the electrical conductors 4 and 5 into the position to be seen in FIG. 4, the clamping screw 21 is screwed in. In this case, the clamping screw 21 exerts a compressive force on the second latching lugs 11 via the clamping shoe 22, until the compressive force exceeds a compressive force to be overcome by the deformation behavior of the second latching lugs 11, and the clamping shoe 22 overcomes the second latching lugs 11 by means of a displacement to the outside and executes the feeding movement with its clamping surface 23 in the direction of the surface of the upper electrical conductor 5. The clamping screw 21 is supported by the thread 25 on the frame 20 and exerts a tensile force directed against the feeding movement of the clamping screw 21 onto the frame 20 of the frame clamp 2. This tensile force results in the frame clamp 2 being pulled out of the cavity 8 counter to the feeding movement of the clamping shoe 22 relative to the plastic holder 3 until the frame clamp finally, with the lower edges of the recesses 9, comes into contact with the lower sides of the first latching lugs 10, which are oriented perpendicular to the walls 17. Due to the perpendicular orientation of the lower sides of the first latching lugs 10, the reaction forces that can be absorbed by the first latching lugs 10 are significantly greater than the compressive force to be overcome by the clamping shoe 22 that is defined by the second latching lugs 11. This ensures that the clamping shoe 22 displaces the second latching lugs 11 and executes the feeding movement, and the clamping screw 21 does not instead pull the frame clamp 2 out of the cavity 8 with the frame 20. The clamping screw 21 can additionally be subjected to a compressive force during the screwing-in process, such that the frame clamp 2 is acted upon as a whole by a compressive force during screwing and is pressed into the cavity 8. The frame clamp 2 is supported on the surface 31 of the base plate 30 of the plastic holder 3, which forms an abutment in this case. Both the formation of the two latching lugs 10 and 11 and the exertion of the compressive force on the clamping screw, individually and in combination, result in the clamping shoe 22 displacing the second latching lugs 11 during the screwing of the clamping screw 21 and performs the feeding movement.

As can be seen in FIGS. 6 and 7, a plurality of openings 18 and 19 are provided in the base plate 30 of the plastic holder 3, which openings 18 and 19 are arranged in the direction of the insertion direction of the frame clamps 2 into the cavity 8 with the first and/or second latching lugs 10 and/or 11 and thereby enable the plastic holder 3 to be produced with the latching lugs 10 and 11 as an injection-molded part in an inexpensive, slide-free tool.

Two first latching lugs 10 and two second latching lugs 11 are provided on the plastic holder 8 on the opposite walls 17, as a result of which the latching of the frame clamp 2 and of the clamping shoe 22 can be realized in a stable and tilt-proof manner. In particular, an unintentional release of the latching can thereby be prevented.

EMBODIMENTS

Embodiment 1

An electrical contact element (1) having a frame clamp (2) having
- a frame (20) having a stationary thread (25),
- a clamping shoe (22) and
- a clamping screw (21) engaging into the stationary thread (25) and being supported on the clamping shoe (22),
- characterized in that
- a plastic holder (3) having a cavity (8) having two insertion openings (14,15) arranged on opposite walls (17) of the cavity (8) is provided for inserting two electrical conductors (4,5) to be contacted with one another, in which the frame clamp (2) is arranged, and
- the frame clamp (2) is captively fixed in the cavity (8) of the plastic holder (3) by means of a latching, and
- the frame clamp (2) is mounted in a floating manner in the cavity (8) of the plastic holder (3) in the direction of at least one axis, which is oriented orthogonally to an insertion direction of the electrical contacts (4, 5) into the insertion openings (14, 15).

Embodiment 2

The electrical contact element (1) according to embodiment 1, characterized in that
- the frame (20) has at least one recess (9), and
- the plastic holder (3) comprises at least one first latching lug (10) arranged on an inner side of a wall (17) of the cavity (8), and
- the latching is formed by an engagement of the first latching lug (10) in the recess (9).

Embodiment 3

The electrical contact element (1) according to embodiment 2, characterized in that
- the engagement of the first latching lug (10) in the recess (9) limits the floating mounting in a direction of the axis.

Embodiment 4

The electrical contact element (1) according to any of embodiments 2 to 3, characterized in that the plastic holder (3) comprises an insertion opening for the frame clamp (2), and the first latching lug (10) comprises a shape which tapers in the direction of the insertion movement of the frame clamp (2) conically towards the center of the plastics holder (3) on its side facing the insertion opening.

Embodiment 5

The electrical contact element (1) according to any of the preceding embodiments, characterized in that the plastic holder (3) has at least one second latching lug (11), which is positioned such that it blocks a movement of the clamping shoe (22) in the direction of a clamping surface (29) arranged on the frame (20) up to a predetermined compressing force of the clamping shoe (22).

Embodiment 6

The electrical contact element (1) according to embodiment 5, characterized in that the second latching lug (11) comprises a shape which tapers in the direction of the clamping movement of the clamping shoe (22) conically towards the center of the plastic holder (3) on its side facing the clamping shoe (22).

Embodiment 7

The electrical contact element (1) according to any of embodiments 2 to 4 and according to any of embodiments 5 or 6, characterized in that the second latching lug (11) is designed such that the predetermined compressing force, up to which the movement of the clamping shoe (22) is blocked, is smaller than the counterforce exerted by the first latching lug (10) on the frame (20).

Embodiment 8

The electrical contact element (1) according to any of embodiments 2 to 4 and according to any of embodiments 5 or 6 or according to embodiment 7, characterized in that the first latching lug (10) and the second latching lug (11) are arranged on inner side faces of the walls (17) of the cavity (8) of the plastic holder (3), which side faces are arranged at right angles to one another.

Embodiment 9

The electrical contact element (1) according to any of embodiments 2 to 4 or according to any of embodiments 5 to 8, characterized in that two pairs of first and/or second latching lugs (10, 11) are provided, each of which is arranged in pairs on opposite walls (17) of the cavity (8) of the plastic holder (3).

Embodiment 10

The electrical contact element (1) according to any of the preceding embodiments, characterized in that the plastic holder (3) comprises guide ribs (16) on the inner side faces of the walls (17), which run parallel to the direction of the insertion movement of the frame clamps (2).

Embodiment 11

The electrical contact element (1) according to any of the preceding embodiments, characterized in that at least one further frame clamp (2) is provided in the plastic holder (3), which frame clamp is mounted insulated by the plastic holder (3).

The invention claimed is:

1. An electrical contact element, comprising:

a frame clamp, wherein the frame clamp comprises:

a frame having a stationary thread;

a clamping shoe; and a clamping screw engaging into the stationary thread and being supported on the clamping shoe, a plastic holder having a cavity and two insertion openings arranged on opposite walls of the cavity, wherein the two insertion openings are configured for two electrical conductors to be inserted through such that the two electrical conductors are to be contacted with one another, wherein the frame clamp is arranged in the plastic holder, wherein the frame clamp is mounted in a floating manner in the cavity of the plastic holder in the direction of at least one axis, which is oriented orthogonally to an insertion direction of the electrical conductors into the insertion openings, wherein the frame has at least one recess, wherein the plastic holder comprises at least one first latching lug arranged on a corresponding at least one inner side of a corresponding at least one wall of the cavity, and wherein the latching is formed by an engagement of the at least one first latching lug in the corresponding at least one recess.

2. The electrical contact element according to claim 1, wherein the engagement of the at least one first latching lug in the at least one recess limits the floating mounting of the frame clamp in the cavity in a direction of the at least one axis.

3. The electrical contact element according to claim 1, wherein the plastic holder comprises a frame clamp insertion opening for the frame clamp, and wherein the at least one first latching lug comprises a shape which tapers in a direction of an insertion movement of the frame clamp conically towards a center of the plastic holder on a side of the at least one first latching lug facing the frame clamp insertion opening.

4. The electrical contact element according to claim 1, wherein the plastic holder has at least one second latching lug, which is positioned such that the at least one second latching lug blocks a movement of the clamping shoe in a direction of a clamping surface arranged on the frame up to a predetermined compressing force of the clamping shoe.

5. The electrical contact element according to claim 4, wherein the at least one second latching lug comprises a shape which tapers in a direction of a clamping movement of the clamping shoe conically towards a center of the plastic holder on a side of the at least one second latching lug facing the clamping shoe.

6. The electrical contact element according to claim 4, wherein the at least one second latching lug is designed such that the predetermined compressing force of the clamping shoe, up to which a movement of the clamping shoe is blocked, is smaller than a counterforce exerted by the corresponding at least one first latching lug on the frame.

7. The electrical contact element according to claim 4, wherein the at least one first latching lug and the at least one second latching lug are arranged on inner side faces of the walls of the cavity of the plastic holder, which inner side faces are arranged at right angles to one another.

8. The electrical contact element according to claim 7, wherein two pairs of first and/or second latching lugs are provided, each of which is arranged in pairs on opposite walls of the cavity of the plastic holder.

9. The electrical contact element according to claim 1, wherein the plastic holder comprises guide ribs on inner side faces of the walls, which run parallel to a direction of an insertion movement of the frame clamp.

10. The electrical contact element according to claim 1, wherein at least one further frame clamp is provided in the plastic holder, which at least one further frame clamp is mounted insulated by the plastic holder.

* * * * *